(12) United States Patent
Chang et al.

(10) Patent No.: US 7,168,019 B1
(45) Date of Patent: Jan. 23, 2007

(54) METHOD AND MODULE FOR UNIVERSAL TEST OF COMMUNICATION PORTS

(75) Inventors: Yu-Chuan Chang, Taipei (TW); Xue-Ning Ren, Shanghai (CN)

(73) Assignee: Inventec Corp, Taipei (TW)

(*) Notice: Subject to any disclaimer, the term of this patent is extended or adjusted under 35 U.S.C. 154(b) by 0 days.

(21) Appl. No.: 09/262,960

(22) Filed: Mar. 4, 1999

(51) Int. Cl.
*G01R 31/28* (2006.01)
*G06F 7/02* (2006.01)

(52) U.S. Cl. .................. 714/724; 714/735; 714/820
(58) Field of Classification Search ............... 714/724, 714/712
See application file for complete search history.

(56) References Cited

U.S. PATENT DOCUMENTS

| | | | | |
|---|---|---|---|---|
| 5,557,741 A | * | 9/1996 | Jones | 714/43 |
| 5,819,112 A | * | 10/1998 | Kusters | |
| 5,875,293 A | * | 2/1999 | Bell et al. | |
| 6,374,372 B1 | * | 4/2002 | Ha | 714/43 |

* cited by examiner

*Primary Examiner*—Phung My Chung
(74) *Attorney, Agent, or Firm*—W. Wayne Liauh

(57) ABSTRACT

The present invention relates to a method and an universal module for testing functions of communication ports of a computer, including both parallel port and serial port. The module includes a logic control unit and connects to a communication port (a serial or a parallel port) for testing the open or short conditions of the ports through walk 1' and a walk 0' logic tests. The testing module not only can check the open condition of a parallel port, but also can check the open and short conditions of a parallel port and a serial port.

21 Claims, 12 Drawing Sheets

METHOD AND MODULE FOR UNIVERSAL TEST OF COMMUNICATION PORTS

The present invention relates to a method and an universal module for testing functions of communication ports. The universal module can be used for both parallel port and serial port and testing the functions of each pin of the communication ports.

Computerized testing methods for checking performance of communication ports (parallel or serial ports) are known. A product of most common use is "QAFACTORY" by Diagsolf Inc. It has almost been a standard of quality and performance test for products of many manufacturers of computer. A specific version of QAFACTORY can only test a parallel port or a serial port, and can only check the open condition of the pins but not the short condition. In other words, the QAFACTORY cannot work with both serial ports and parallel ports, and cannot check out the short circuit condition of the pins.

FIG. 1 illustrates the pins layout of a parallel port. It has 25 pins including 8 ground lines (GND) and 17 transmission lines. The 17 lines include 8 data lines D0 to D7 and 9 control or communication lines, or 12 output pins and 5 input pins by their functions. The classifications are shown in TABLE 1.

TABLE 1

| Output pins | -STROBE, D0, D1, D2, D3, D4, D5, D6, D7,-AUTOFD, -INT, -SLCTIN |
|---|---|
| Input pins | -ACK, BUSY, FE, SLCT, -ERROR |

The prior QAFACTORY method for testing a parallel port is to connect some pins of the port as shown in FIG. 1, to provide output signals to the output pins and to monitor the input pins. If the received signal is the same with the output signal, the two connected pins are assured of no open circuit problem. As shown in the figure, 5 output pins are connected to 5 input pins respectively, and any open condition of the 10 pins can be checked.

But it is obvious that only 10 of the 17 pins are checked, so the result is not fully correct.

An object of the present invention is therefore to provide an universal module for testing the performance of parallel and serial ports.

The universal module for testing parallel and serial ports according to the present invention includes a voltage transducer for supplying different voltage powers to the two kinds of communication ports during testing.

Another object of the present invention is to provide an universal module for testing both the open and short circuit conditions of pins of parallel and serial ports.

The universal module for testing parallel and serial ports according to the present invention includes a logic control unit for two-way communication with a computer, and checking the open, short and normal functional conditions of the pins of a communication port through walk 1' and walk 2' logic test procedures.

A further object of the present invention is to provide a method and apparatus for detecting the open circuit condition of all pins (excepting the ground pins) of a parallel port.

The testing method for communication ports according to the present invention includes the following steps:

1) Providing a testing module connectable through pins of a parallel or a serial port and communicating with a computer linking to the communication port;

2) Initializing the registers which are corresponding to the pins to a predetermined value;

3) Transferring a predetermined data between the testing communication port and the computer, and recording the received data into the registers; and 4) Comparing the received data with the predetermined data and judging the functions of the pins.

The objectives and advantages of the present invention will become apparent from a detailed description provided below, with reference to the accompanying drawings.

Figure 1:
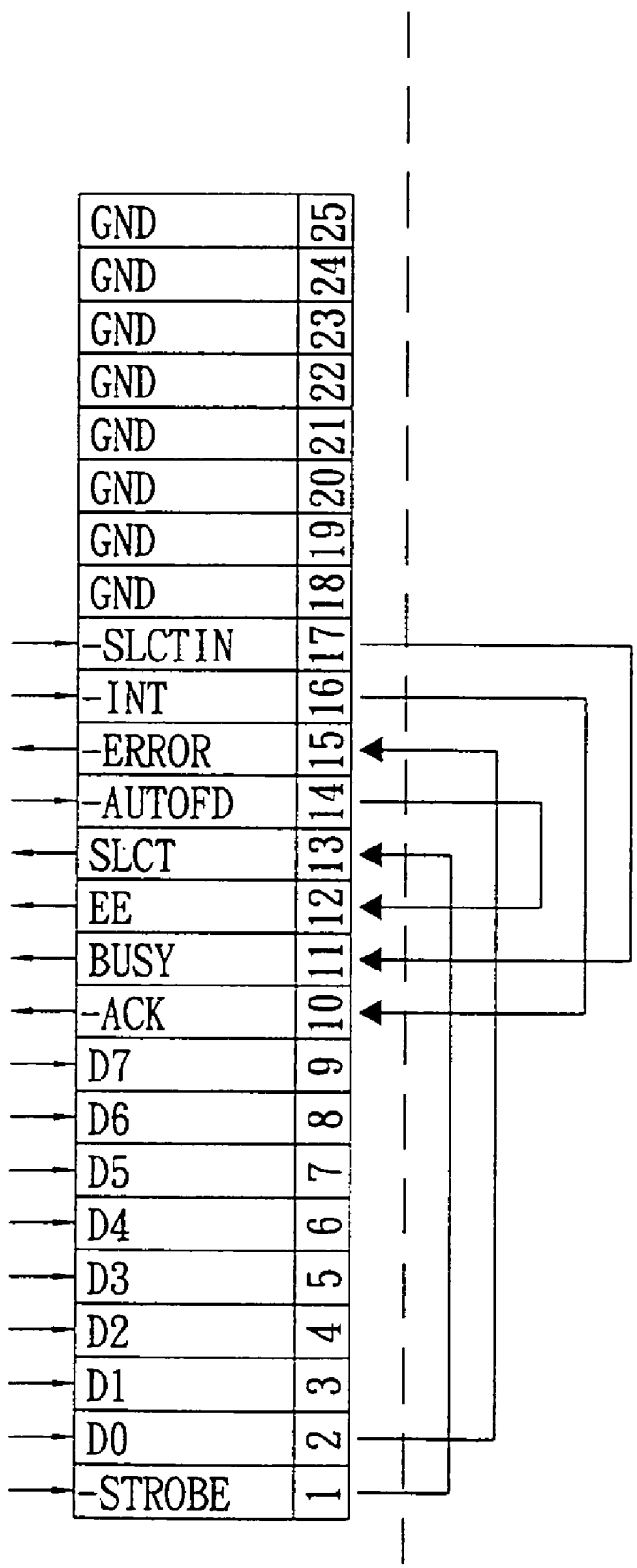
FIG. 1 is a layout diagram of pins of a parallel port and the connection manner of a prior art testing method.

The testing method for communication ports according to the present invention includes the following steps:

1) Providing a testing module connectable through pins of a parallel or a serial port and communicating with a computer linking to the communication port;

2) Initializing the registers which are corresponding to the pins to a predetermined value;

3) Transferring a predetermined data between the testing communication port and the computer, and recording the received data into the registers; and 4) Comparing the received data with the predetermined data and judging the functions of the pins.

Embodiments of the present invention will be described below.

FIRST EMBODIMENT

An universal testing module for testing parallel and serial ports according to a first embodiment of the present invention includes a logic control unit for two-way communication with a computer, and checking the open, short and normal functional conditions of the pins of a communication port through a walk 1' and walk 2' logic testing procedures.

In the walk 1' testing, one of the output pins is set with logic value "1" while the rest are set with "0". By orderly changing the value "1" pin and checking the received values of input pins, the open or short conditions of the pins can be detected. On the contrary, in the walk 0' testing, one of the output pins is set with logic value "0" while the rest are set with "1". By orderly changing the value "0" pin and checking the received values of input pins, the open or short conditions of the pins can also be detected.

For example, TABLE 2 lists the corresponding data for 8 pins when performing a walk 1' logic test; TABLE 3 lists the corresponding data for 8 pins when performing a walk 0' logic test.

TABLE 2

|            | Pin 1 | Pin 2 | Pin 3 | Pin 4 | Pin 5 | Pin 6 | Pin 7 | Pin 8 |
|------------|-------|-------|-------|-------|-------|-------|-------|-------|
| Test pin 1 | 1     | 0     | 0     | 0     | 0     | 0     | 0     | 0     |
| Test pin 2 | 0     | 1     | 0     | 0     | 0     | 0     | 0     | 0     |
| Test pin 3 | 0     | 0     | 1     | 0     | 0     | 0     | 0     | 0     |
| Test pin 4 | 0     | 0     | 0     | 1     | 0     | 0     | 0     | 0     |
| Test pin 5 | 0     | 0     | 0     | 0     | 1     | 0     | 0     | 0     |
| Test pin 6 | 0     | 0     | 0     | 0     | 0     | 1     | 0     | 0     |
| Test pin 7 | 0     | 0     | 0     | 0     | 0     | 0     | 1     | 0     |
| Test pin 8 | 0     | 0     | 0     | 0     | 0     | 0     | 0     | 1     |

TABLE 3

|            | Pin 1 | Pin 2 | Pin 3 | Pin 4 | Pin 5 | Pin 6 | Pin 7 | Pin 8 |
|------------|-------|-------|-------|-------|-------|-------|-------|-------|
| Test pin 1 | 0     | 1     | 1     | 1     | 1     | 1     | 1     | 1     |
| Test pin 2 | 1     | 0     | 1     | 1     | 1     | 1     | 1     | 1     |
| Test pin 3 | 1     | 1     | 0     | 1     | 1     | 1     | 1     | 1     |
| Test pin 4 | 1     | 1     | 1     | 0     | 1     | 1     | 1     | 1     |
| Test pin 5 | 1     | 1     | 1     | 1     | 0     | 1     | 1     | 1     |
| Test pin 6 | 1     | 1     | 1     | 1     | 1     | 0     | 1     | 1     |
| Test pin 7 | 1     | 1     | 1     | 1     | 1     | 1     | 0     | 1     |
| Test pin 8 | 1     | 1     | 1     | 1     | 1     | 1     | 1     | 0     |

Figure 2:
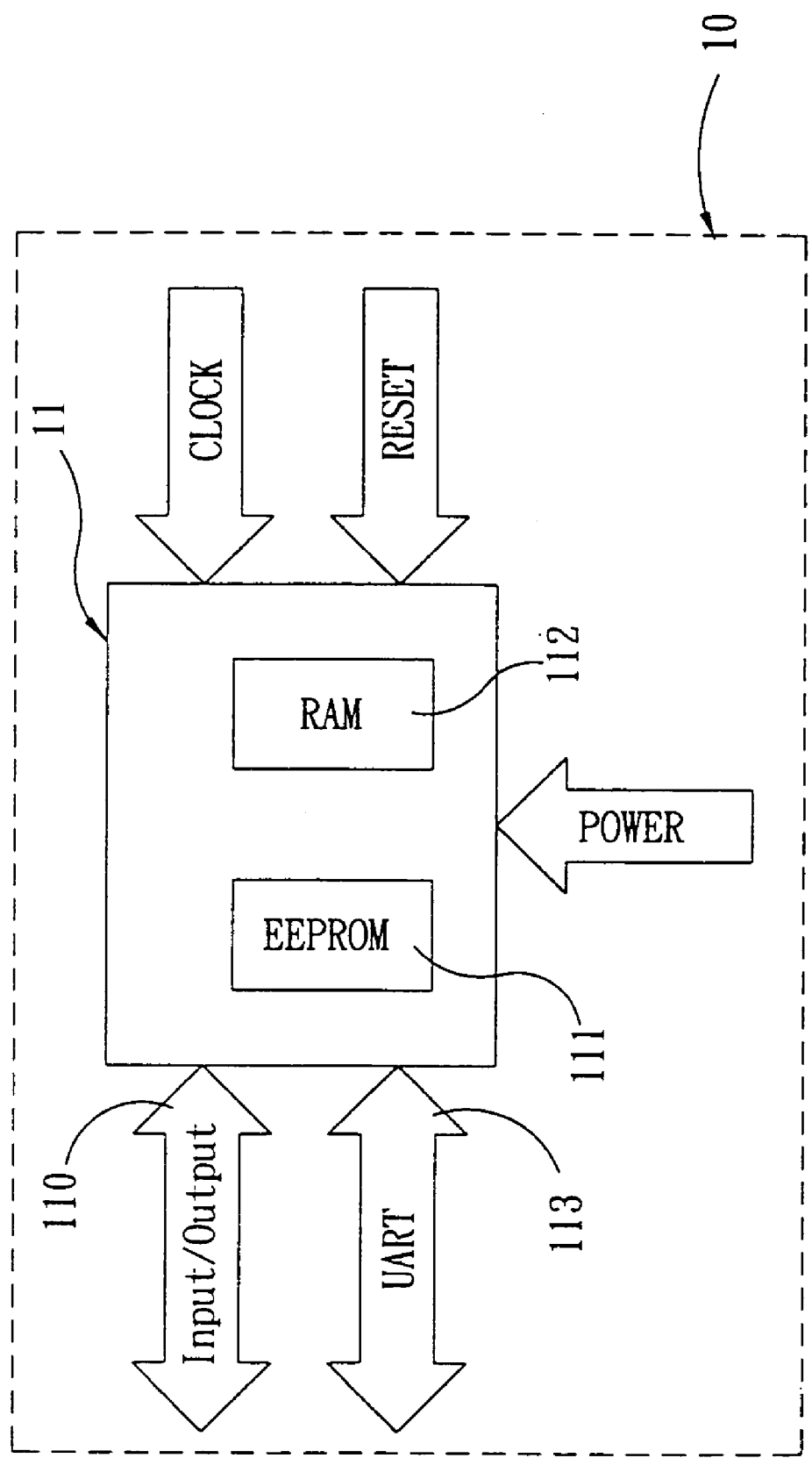
FIG. 2 is a constructional block diagram of a testing module of a first embodiment of the present invention.
Figure 3:
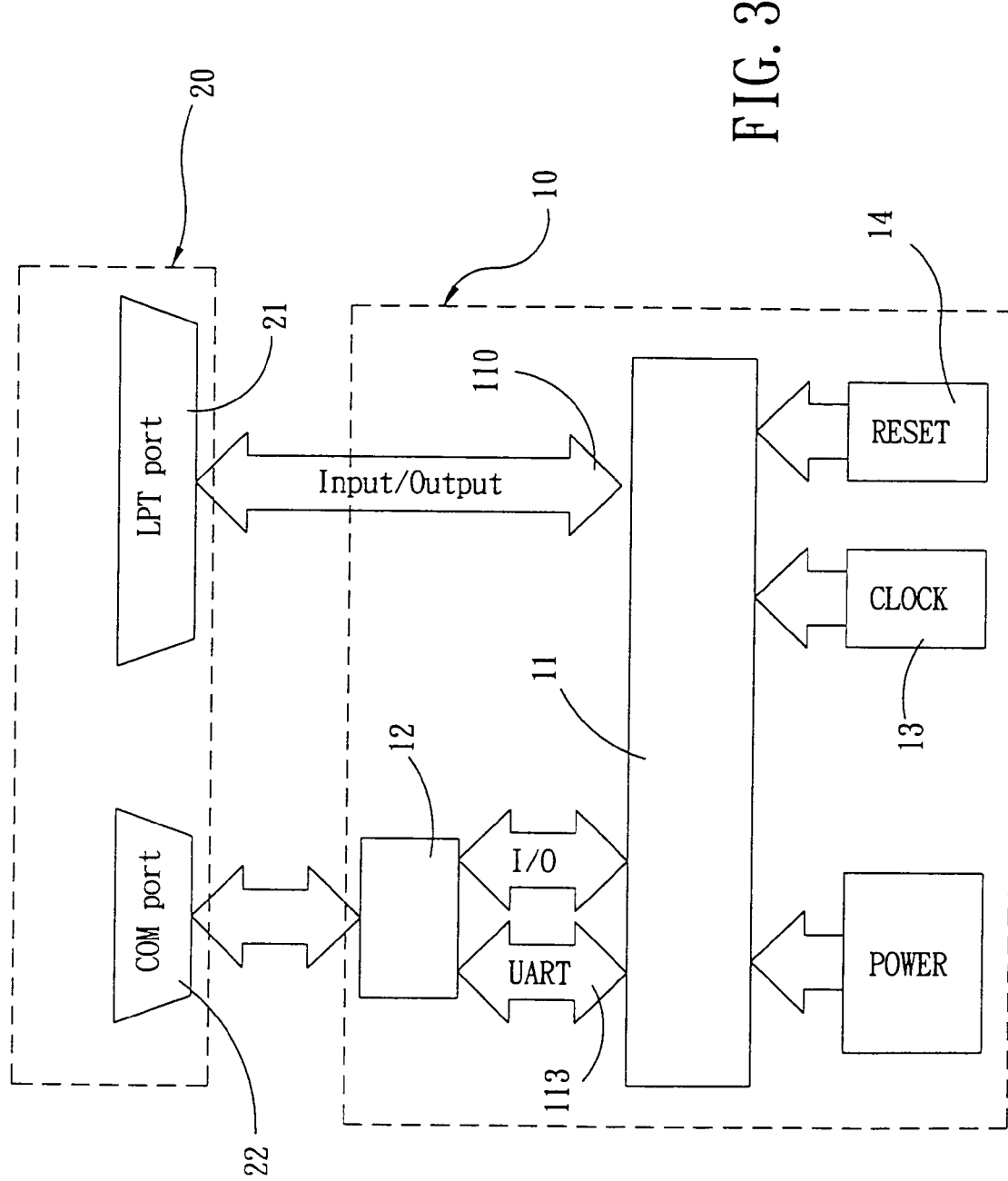
FIG. 3 is a block diagram showing the connection of communication ports to a testing module of a first embodiment of the present invention.

Now referring to FIG. 2 and FIG. 3, a first embodiment of the present invention is shown. An universal testing module 10 is basically a microcomputer system which can connect to the testing communication port, such as serial port 22 or a parallel port 21 of a computer 20.

The core of the testing module 10 is a logic control unit 11 which includes at least a series of input/output port 110 for communication with a parallel port 21. The logic control unit 11 includes inside an EEPROM (electrically erasable programmable read-only memory) 111 for storing machine code instructions for testing the communication port; a RAM (random-access memory) 112 for temporary exchange of data; and an UART (universal asynchronous receiver/transmitter) 113. The logic control unit 11 further includes outside a clock circuit 13 (see also FIG. 6) for providing time signals; a power source taken form the computer 20 or elsewhere; and a reset circuit 14 (see also FIG. 6) for composing the basic microcomputer system.

Actually, the testing voltages of a parallel port 21 and a serial port 22 are different, for example, the voltage for a parallel port is +5V, while the voltage for a serial port is +/−15V; the voltage of a computer serial port RS-232 is different from a transistor logic (TTL) circuit that 0V is low and 5V is high for TTL, while +15V is low and −15V is high for RS-232. For testing the open or short condition of every pin of a serial port 22, a voltage converter 12 is incorporated in the testing module 10 in the embodiment of the present invention. The voltage converter 12 is an integrated circuit working on 5V power input and accomplishing interchange of RS-232 and TTL. So the logic control unit 11 can communicate with the computer 20 through the serial port 22 and execute the testing.

Figure 6:
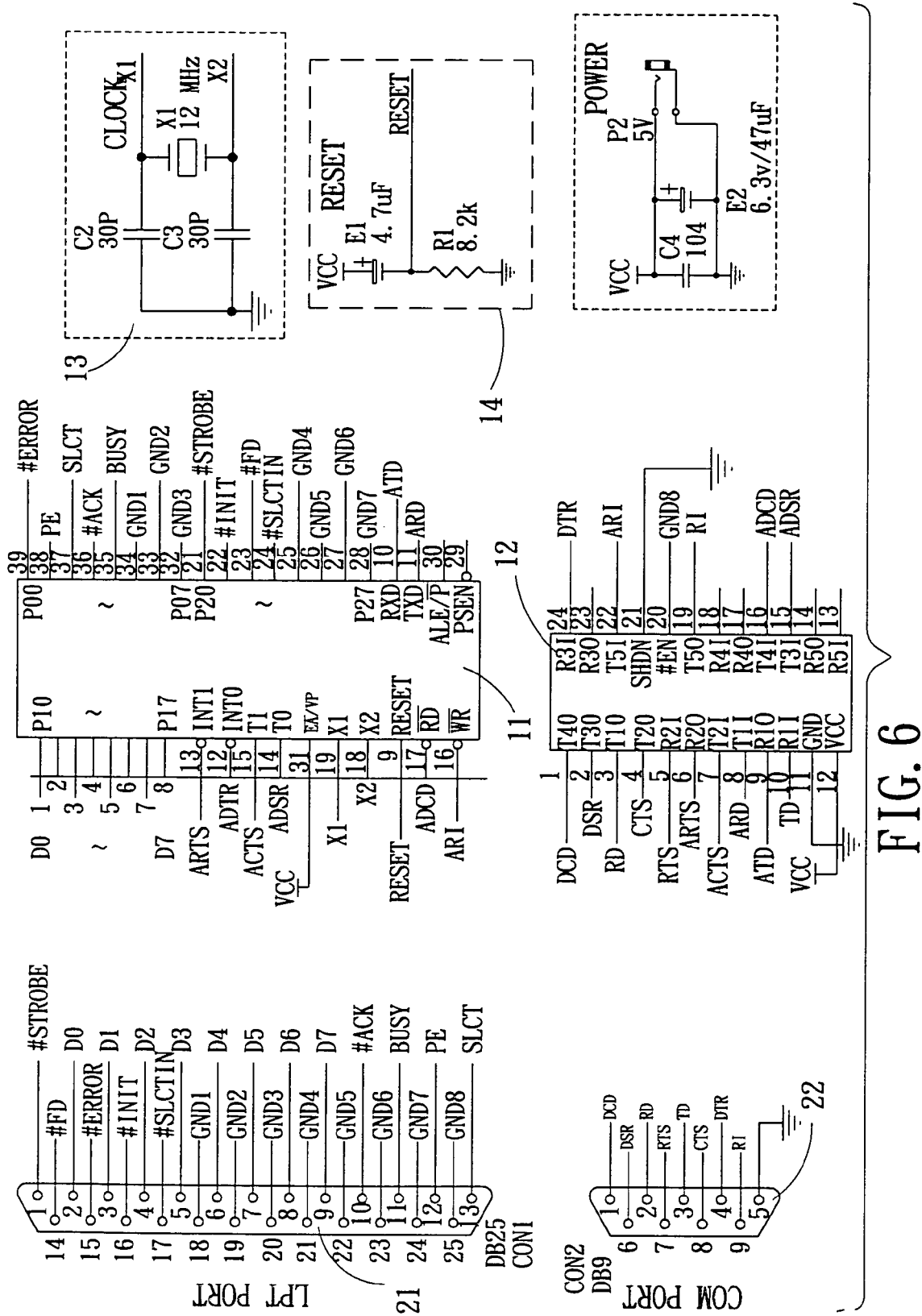
FIG. 6 is a circuit diagram of a testing module of a first embodiment of the present invention.

As shown in FIG. 3, the testing module 10 connects both parallel port 21 and serial port 22 of the computer 20. The logic control unit 11 provides four pairs of 8-bit input/output ports for transmitting and receiving control or data signals. In other words, there are 4*8=32 input/output lines for controlling and reading signals of all pins of the parallel port 21 and the serial port 22 and detecting the open or short circuit condition. The detailed connection of the pins and ports are shown in FIG. 6.

Before the testing module 10 and the computer 20 starting a main test of an RS-232 port, a prior communication test using only three pins of TD, RD and GND is taken so as to minimizes the requirement of the testing module 10 from the computer resources. The communication test may also ignore the certain pins of TD and RD but use any two pins of the parallel port 21 and serial port 22 and the GND pin for the test. If the test fails, it is sure that there is a problem for the three pins.

After the communication test, the main test proceeds. Each pin of the parallel port 21 or the serial port 22 has its corresponding bit in the register. So we may obtain or settle the status of each pin by reading or writing the corresponding bit.

Since some of the pins of a parallel port 22 or a serial port 22 are used for writing, and some are for reading only, the present invention tests them in two directions separately. For those write-only pins, the computer 20 side is set up with a certain voltage, then the status on the side of the testing module 10 is read. On the contrary, for those read-only pins, the side of the testing module is set up with a certain voltage, and the status on the computer side is read. Generally, a floating pin is of high. To assure that when floating is low, the test can still be made, we will test them twice by walk 0' and a walk 1' tests.

Figure 4:
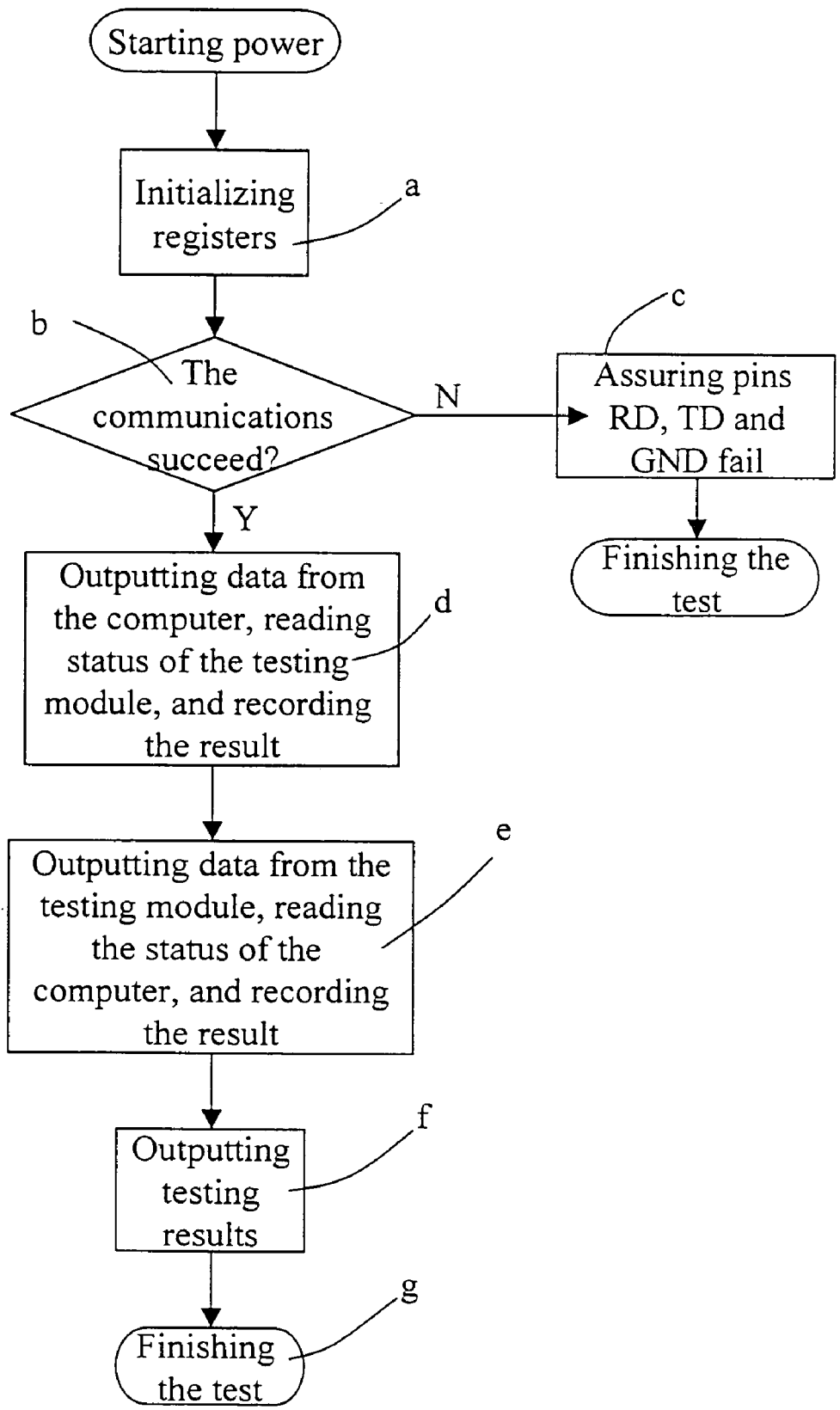
FIG. 4 is a flowchart showing the testing procedure of a first embodiment of the present invention.

Referring to FIG. 3 and FIG. 4, a test settlement and method of a first embodiment of the present invention is shown. The testing module 10 is connected to a parallel port 21 and a serial port 22 of a computer 20 and establishing communication paths. The logic control unit 11 is then testing the communication ports 21 and 22 according to machine code instructions stored in the logic control unit 11 by the following steps:

a) Initializing the corresponding registers of the pins to a certain value (the registers may be the RAM 112, see FIG. 2, in the testing module 10;

b) Checking if the communications between the testing module 10 and the communication ports succeed. If yes, jumps to step d), or proceeds to the next step;

c) Assuring that the pins RD, TD and GND of the serial port 22 fail. Jumps to step g);

d) Outputting certain data from the computer 20 side, and reading the status at the side of the testing module 10 via the parallel port 21 and the serial port 22 by a walk 0' and a walk 1' logic test separately, and recording them as a first testing result;

e) Outputting certain data from the side of the testing module 10, and reading the status of computer 20 side via the parallel port 21 and the serial port 22 by a walk 0' and a walk 1' logic test separately, and recording them as a second testing result;

f) Outputting the first and the second testing results; and g) Finishing the test.

Of course the sequence of the steps d) and e) can be interchanged without influencing the result.

Figure 5A:
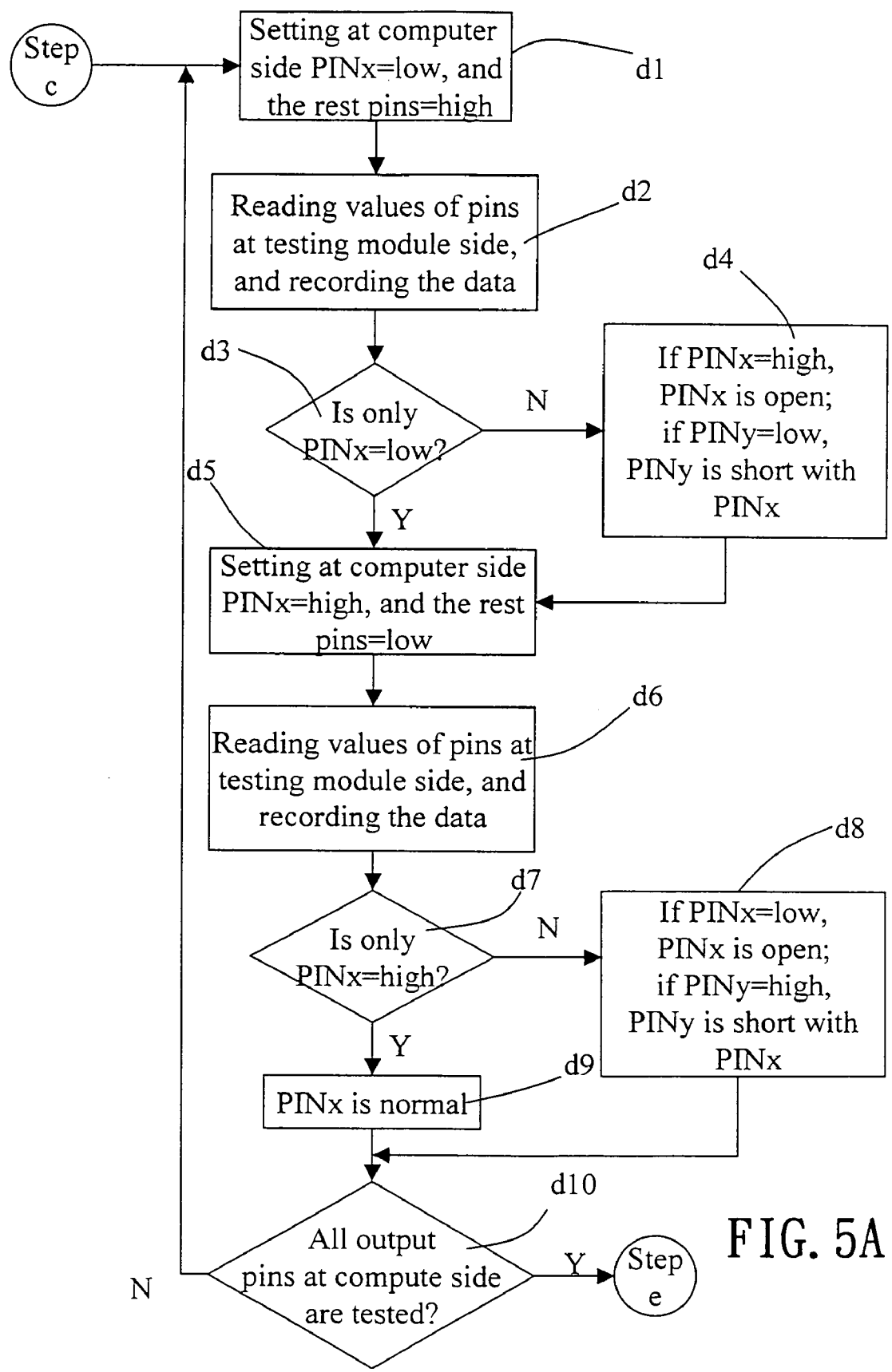
FIG. 5A is a detailed flowchart showing a partial procedure of FIG. 4.

The logic tests in step d) are further shown in FIG. 5A with the following steps:

d1) Setting an output pin PINx at the computer 20 side with logic value "low", and the rest pins with value "high";

d2) Reading the logic values of the pins at the side of the testing module 10, and recording the values in the registers corresponding to the pins as a data record;

d3) Checking if only the value of PINx is "low". If yes, jumps to step d5), or proceeds to the next step;

d4) If the PINx is high, the PINx is open; if any other pin PINy excepting from the PINx is also low, the PINy is short with the PINx;

d5) Setting an output pin PINx at the computer 20 side with logic value "high", and the rest pins with value "low";

d6) Reading the logic values of the pins at the side of the testing module 10, and recording the values in the registers corresponding to the pins as a data record;

d7) Checking if only the value of PINx is "high". If yes, jumps to step d9), or proceeds to the next step;

d8) If the PINx is low, the PINx is open; if any other pin PINy excepting from the PINx is also high, the PINy is short with the PINx; jumps to step d10);

d9) Assuring that PINx is normal (no open or short);

d10) Checking if all the output pins at the computer 20 side are tested. If yes, jumps to step e), or returns to step d1) for testing the next output pin.

Figure 5B:
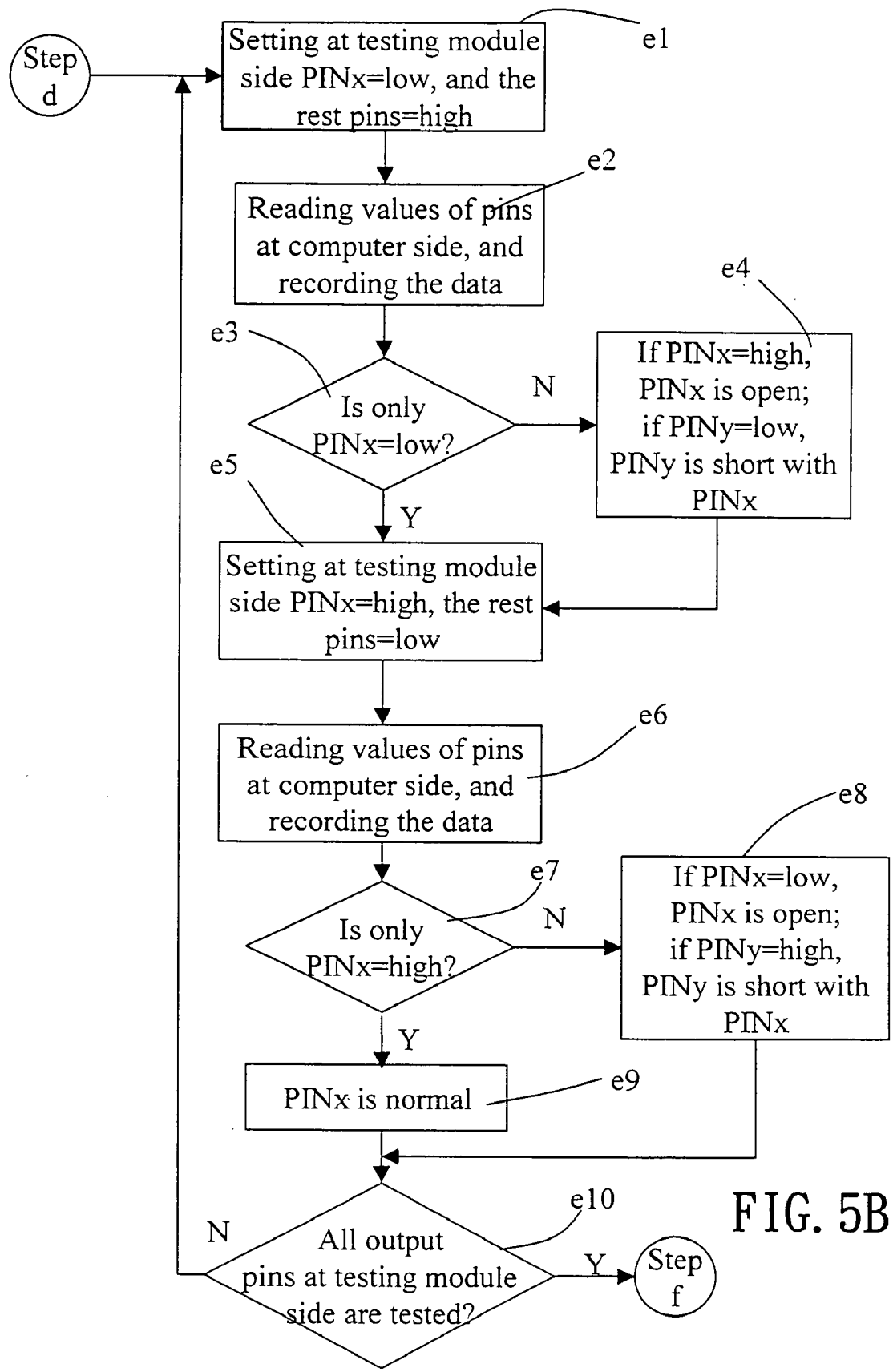
FIG. 5B is a detailed flowchart showing another partial procedure of FIG. 4.

The logic tests in step e) are further shown in FIG. 5B with the following steps:

e1) Setting an output pin PINx at the side of the testing module 10 with logic value "low", and the rest pins with value "high";

e2) Reading the logic values of the pins at the computer 20 side, and recording the values in the registers corresponding to the pins as a data record;

e3) Checking if only the value of PINx is "low". If yes, jumps to step e5), or proceeds to the next step;

e4) If the PINx is high, the PINx is open; if any other pin PINy excepting from the PINx is also low, the PINy is short with the PINx;

e5) Setting an output pin PINx at the side of the testing module 10 with logic value "high", and the rest pins with value "low";

e6) Reading the logic values of the pins at the computer 20 side, and recording the values in the registers corresponding to the pins as a data record;

e7) Checking if only the value of PINx is "high". If yes, jumps to step e9), or proceeds to the next step;

e8) If the PINx is low, the PINx is open; if any other pin PINy excepting from the PINx is also high, the PINy is short with the PINx; jumps to step e10);

e9) Assuring that PINx is normal (no open or short);

e10) Checking if all the output pins at the side of the testing module 10 are tested. If yes, jumps to step f), or returns to step e1) for testing the next pin.

SECOND EMBODIMENT

Figure 7:
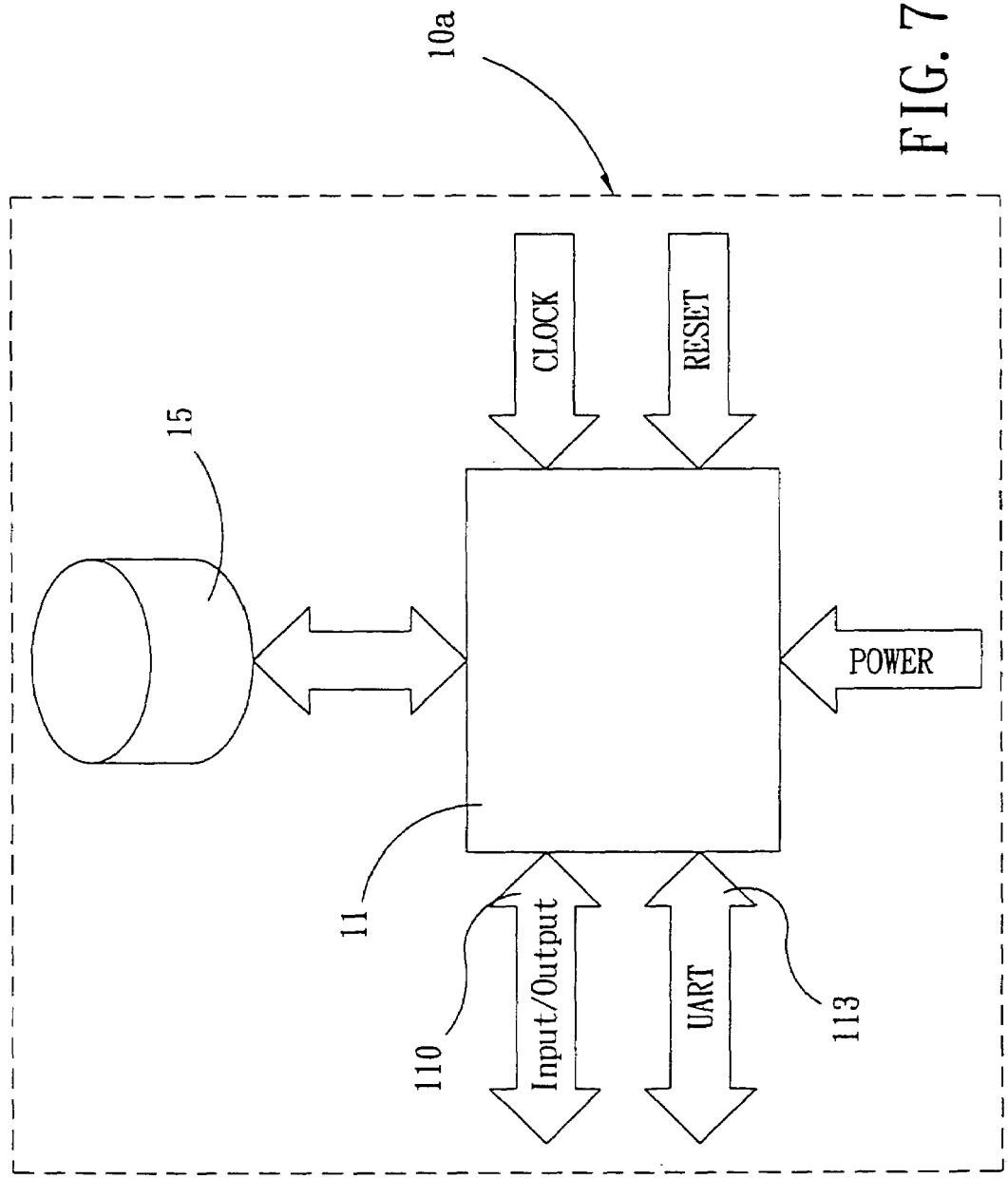
FIG. 7 is a constructional block diagram of a testing module of a second embodiment of the present invention.

Besides the universal testing module 10 shown in FIG. 2, an universal testing module 10*a* shown in FIG. 7 is a second embodiment of the present invention. The modification is to store the machine code instructions and the memory for temporary data exchange in a memory unit 15, such as a memory or disk, separated from the logic control unit 11. The method and steps for testing the open or short condition of the parallel port 21 and the serial port 22 is still the same.

THIRD EMBODIMENT

Figure 8:
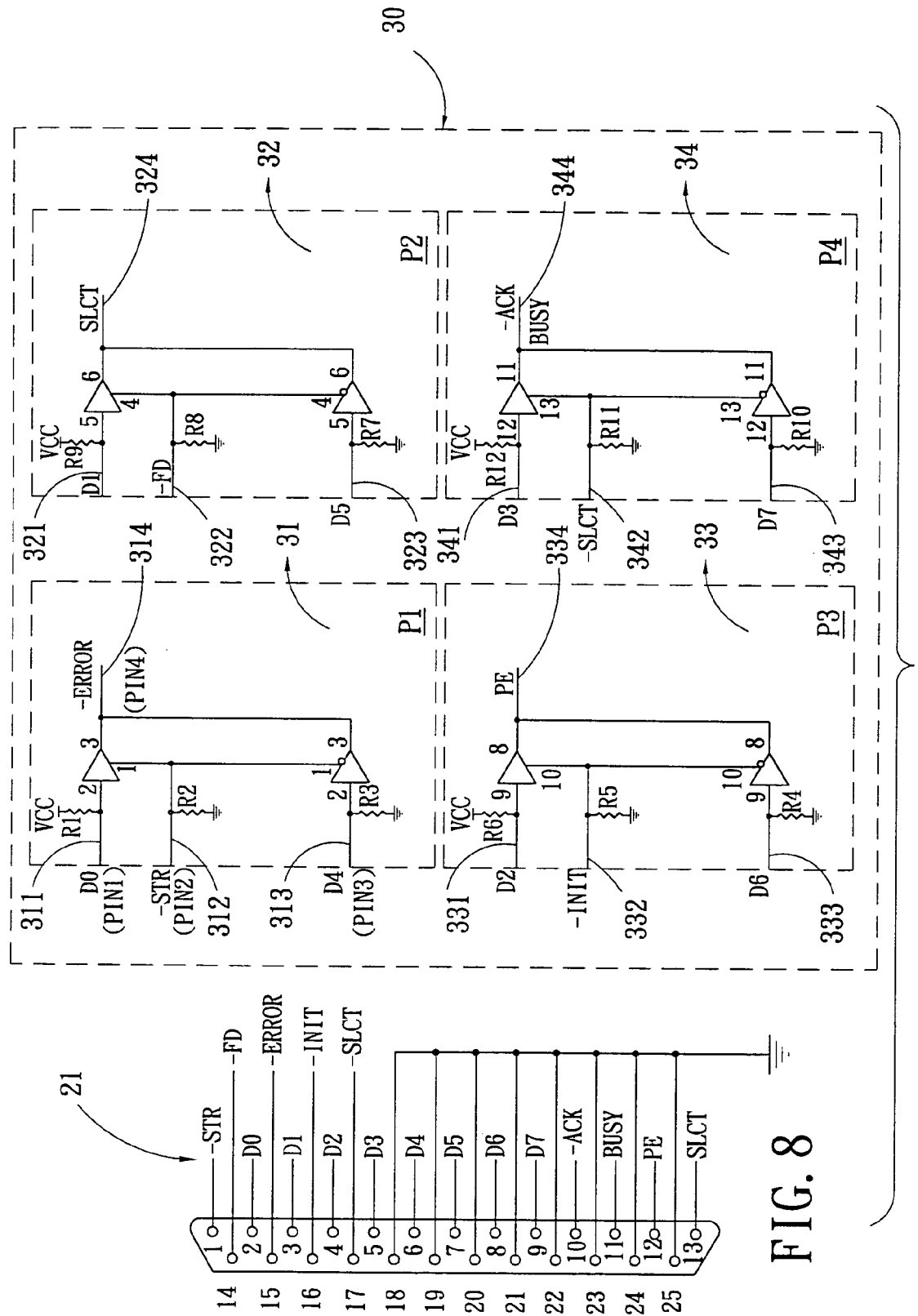
FIG. 8 is a block diagram showing the connection of a communication port to a testing module of a third embodiment of the present invention.

A testing module 30 shown in FIG. 8 is a third embodiment of the present invention especially for testing the open condition of each pin (besides the ground GND) of a parallel port 21. A logic control unit of the testing module 30 is composed of four logic circuit cells 31, 32, 33 and 34 of the same composition. There are four selection lines and eight data lines connecting to twelve output pins of the parallel port 21 (please refer to FIG. 1 and TABLE 4). The testing model 30 further includes four output lines connecting to five input pins of the parallel port 21. The eight ground lines GND are already connected inside the computer, so they are not individually identified here.

TABLE 4

| ITEM | NUMBERED |
| --- | --- |
| Selection Lines | 312, 322, 332, 342 |
| Data Lines | 311, 313, 321, 323, 331, 333, 341, 343 |
| Output Lines | 314, 324, 334, 344 |

Figure 9:
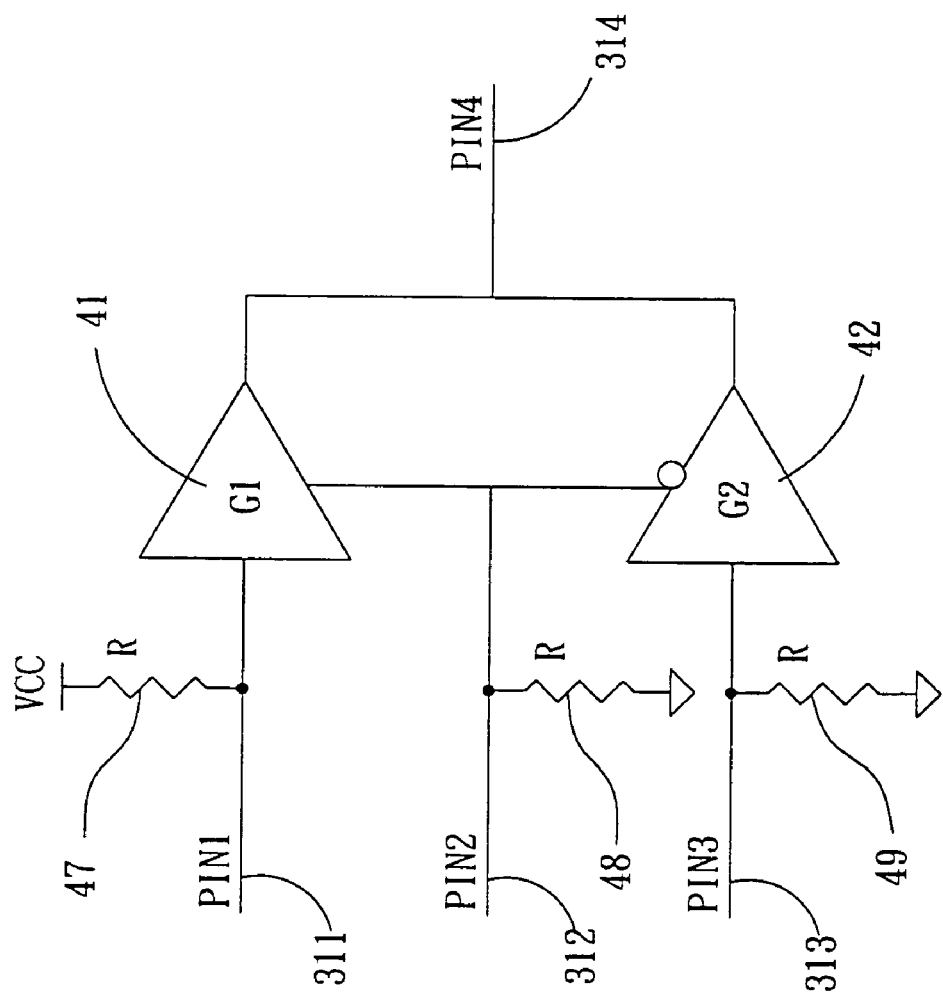
FIG. 9 is a partial circuit diagram of the testing module of FIG. 8.

The structure of the logic circuit cells 31, 32, 33 and 34 is described below by taking the cell 31 as an example. As shown in FIG. 9, the cell comprises two controllable gate designated as a first gate 41 (G1) and a second gate 42 (G2); a first pin 311 (PIN1) and a third pin 313 (PIN3) connecting to the gates G1 and G2 respectively; a second pin 312 (PIN2) used as a control line of the gates; and a fourth pin 314 (PIN4) used as an output line of the gates. The logic value of the circuit is listed as TABLE 5.

TABLE 5

| PIN2 | PIN1 | PIN3 | PIN4 |
| --- | --- | --- | --- |
| 1 | 1 | X | 1 |
| 1 | 0 | X | 0 |
| 0 | X | 1 | 1 |
| 0 | X | 0 | 0 |

When PIN2 is low, PIN4=PIN3. When PIN2 is high, PIN4=PIN1.

To stabilize the output of the circuit when there is a pin open, a pull up resistor 47 is added to PIN1, and two pull down resistors 48, 49 are added to PIN2 and PIN3 respectively. Therefore, when PIN1 is open, the input of G1 is still high; when PIN 3 is open, the input of G2 is low; and when PIN2 is open, the control line of G1, G2 remains low, so the G2 is close and the G1 is open, the logic state is PIN4=PIN3.

Figure 10:
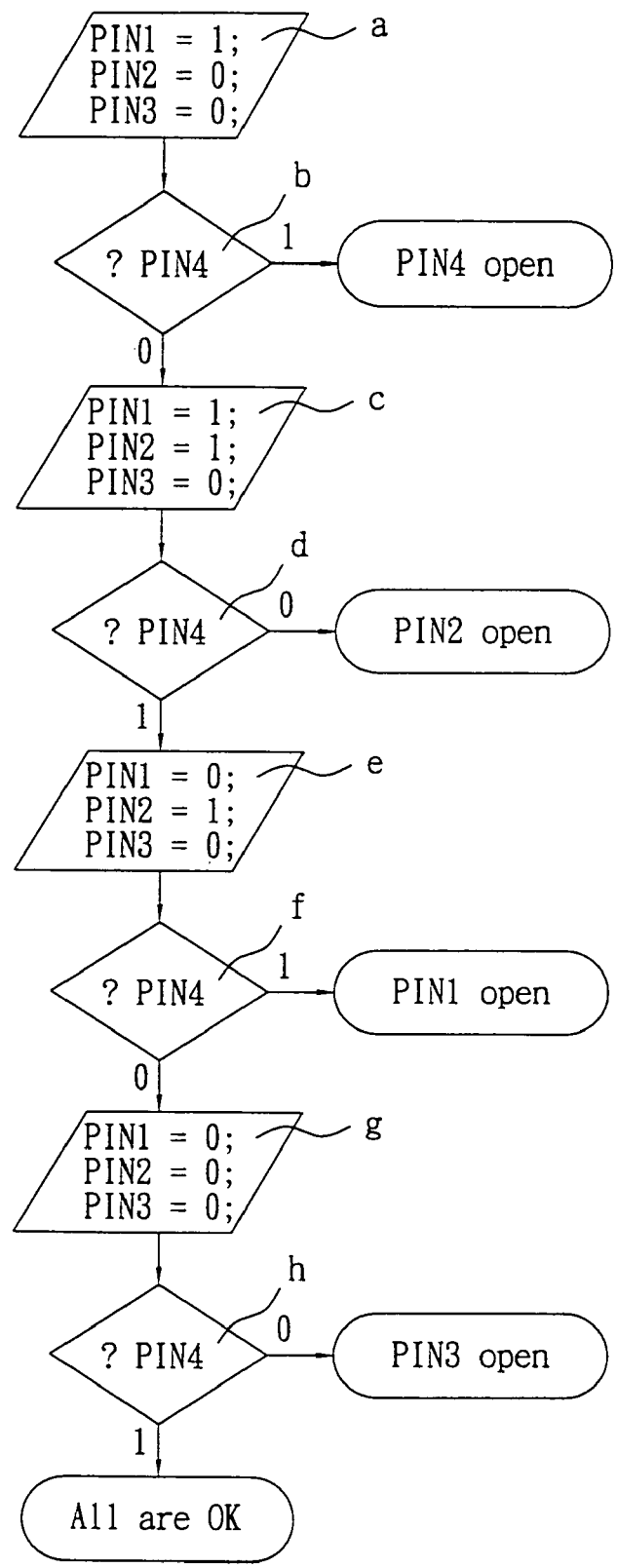
FIG. 10 is a flowchart showing the testing procedure of the third embodiment of the present invention.

The testing procedure is described below. As shown in FIG. 10, since the condition of the pins other than PIN4 depend on the PIN4, a checking for assuring that PIN4 is normal (not open) is first performed. The steps are:

a) Setting PIN1=1, PIN2=0 and PIN3=0;

b) Checking if PIN4=0, if yes, proceeding to the next step, or PIN4 is open;

c) Setting PIN1=1, PIN2=1 and PIN3=0;

b) Checking if PIN4=1, if yes, proceeding to the next step, or PIN2 is open;

e) Setting PIN1=0, PIN2=1 and PIN3=0;

f) Checking if PIN4=0, if yes, proceeding to the next step, or PIN1 is open;

g) Setting PIN1=0, PIN2=0 and PIN3=1;

h) Checking if PIN4=1, if yes, all the pins are normal, or PIN3 is open.

The aforesaid steps will be further described as follows.

When setting PIN1=1, PIN2=0 and PIN3=0, the G2 is close and G1 is open, the logic value is 0, so if PIN4=PIN3=0, the PIN4 is normal. But if PIN4=1, it is open (because when the line is open, the signal is high).

During testing the PIN4, if any of the PIN1, PIN2 and PIN3 is open, the aforesaid pull up resistor 47 or the pull down resistors 48, 49 will function. When PIN1 is open, the resistor 47 makes the voltage to Vcc (high). When PIN2 or PIN3 is open, the resistor 48 or 49 makes the voltage to ground (low). Therefore, whatever the PIN1, PIN2 or PIN3 is open or not, the signals always remain as PIN1=1, PIN2=0 and PIN3=0, the test for PIN4 is independent to the condition of other pins, and the condition of PIN4 can be ascertained.

Then the selection line PIN2 is tested. Let PIN1=1 and PIN3=0. Same as above, by the function of the pull up and pull down resistors, the status of the pins will not influenced by any open condition. Let PIN2=1, since the G1 is close and the G2 is open, the logic value is 1, if PIN4=1 then PIN2 is normal, otherwise PIN2 is open.

Further, let PIN1=0, PIN2=1 and PIN3=0. The G1 is close and the G2 is open, the logic value is 1. If PIN4=0 then PIN1 is normal. Otherwise, if PIN4=1, PIN1 is open. (When PIN1 is open. its voltage is pulled up by the resistor to high)

Finally, let PIN=0, PIN2=0 and PIN3=1. The G1 is close and the G2 is open, the logic value is 1. If PIN4=1 then PIN3 is normal. Otherwise, if PIN4=0, PIN3 is open. (When PIN3 is open. its voltage is pulled down by the resistor to low)

Through the aforesaid test, any open pin of the parallel port 21 is ascertained. If there are more than one pin open, the prior open pin should be neglected, then test again till all finished.

As shown in FIG. 1, the parallel port 21 has 12 output pins and 5 input pins. Comparing to FIG. 8, the four logic circuit cells 31, 32, 33 and 34 cover the 12 output pins as input lines and the 5 input pins as output lines in which two are set to the output line 344. Since the two are the input pins of the parallel port 21, they will not interference with each other, we can test the two pins respectively by testing the output line 344 two times and make sure that they are not open.

Figure 11:
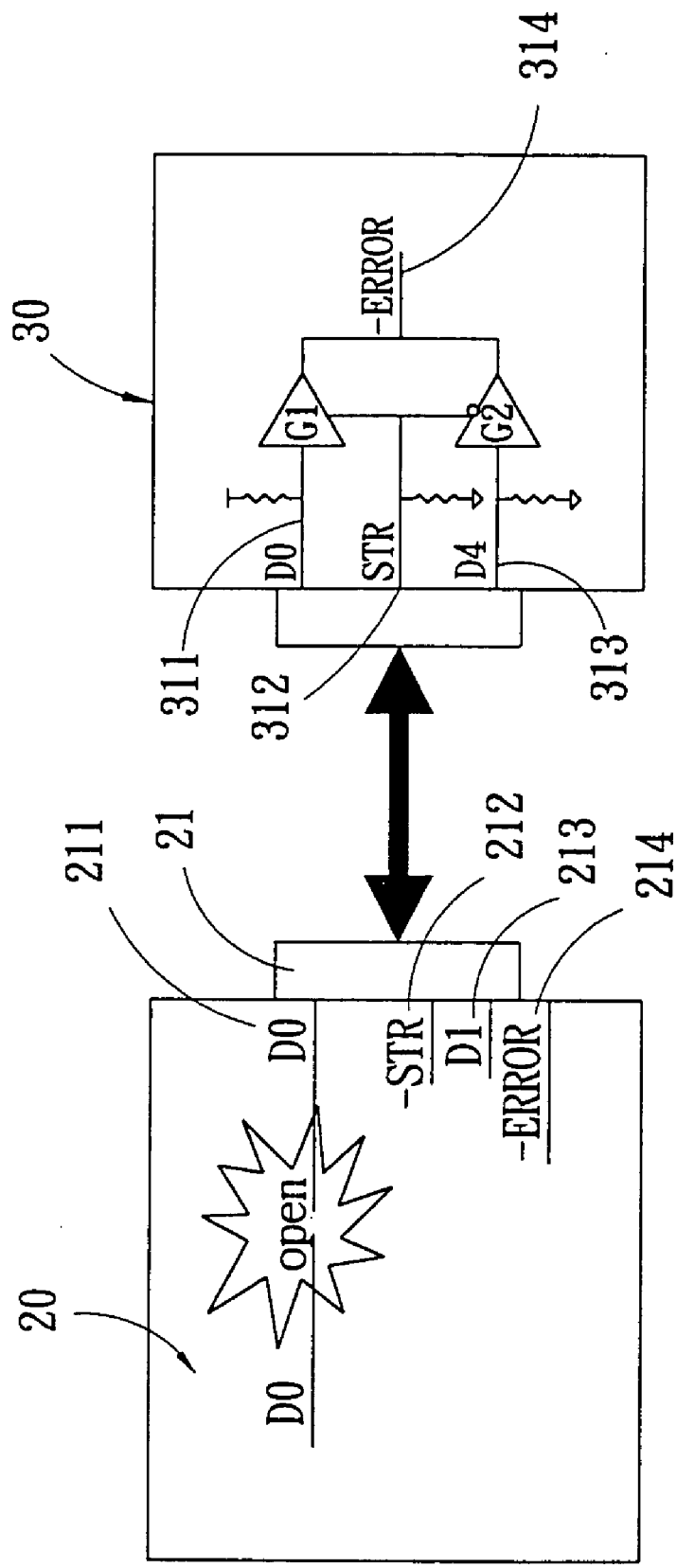
FIG. 11 is a descriptive diagram showing the testing module of the third embodiment of the present invention when testing a communication port having an open pin.

FIG. 11 shows a testing example of the third embodiment. The testing module 30 is connecting to a parallel port 21 of a computer 20. The corresponding pins and lines are listed in TABLE 6.

TABLE 6

| D0: 211 | PIN1: 311 |
| -STR: 212 | PIN2: 312 |
| D1: 213 | PIN3: 313 |
| -ERROR: 214 | PIN4: 314 |

Under normal condition, when the pin DO (line 211) connecting to PIN1 (311) of the testing module 30 via parallel port 21 is set to low (211=0) while –STR=1 and D1=0, the logic value output is "0".

But, supposing pin DO (211) is open, it makes the pin Do of the parallel port 21 floating, the voltage of D0 is then pulled up by the pull up resistor to D0=1. So, the reading of pin –ERROR is "1" instead of the ordinary "0", and the open pin D0 can be detected.

Basically, the setting for testing a pin is to load a reverse setting value of the pull up or pull down resistors, so upon an open pin, a reverse logic value will be obtained and found out.

Generally the signal of an open line is high. But it may also be designed as low. In this situation, the logic circuit design in the aforesaid embodiment can be changed just with a reverse logic.

The selection lines and output lines of the testing module 30 according to the present invention is connecting to the communication port of a computer 20 and using the computer for the testing procedure. Actually, the testing procedure can be executed through other outer logical means, and not limited to the computer only.

The advantages of the present invention are:
1) Capable of testing both of the parallel and serial ports of a computer;
2) Capable of testing the open or short circuit conditions of all pins of parallel or serial ports; and
3) Capable of testing the open condition of each pin (excepting ground pins) of a parallel port.

Although the invention has been described in connection with preferred embodiments, it will be understood by those skilled in the art that various changes may be made without departing from its scope.

The invention claimed is:

1. A universal testing module, capable of connecting to a computer having communication ports to be tested and forming communication paths through said ports, for testing the condition of each pin of a parallel port and a serial port of said communication ports, said universal testing module comprising:
   a logic control unit, having at least a pair of input/output ports for communicating with said parallel port;
   a memory unit for storing instructions for controlling said logic control unit and said computer and for temporary exchange of data; and an universal asynchronous combined receiver and transmitter; and
   a voltage converter for voltage interchange of RS-232 and TTL and enabling said logic control unit to communicate with said computer through said serial port and executing a testing procedure by comparing input and output signals.

2. A universal testing module according to claim 1 wherein said memory unit comprises:
   an electrically erasable programmable read-only memory for storing machine code instructions for testing said communication port; and
   a random-access memory for temporary exchange of data.

3. A universal testing module according to claim 1 wherein said memory unit is located outside said logic control unit.

4. A universal testing module according to claim 1 further comprising a clock circuit for providing time signals, and a reset circuit.

5. A An universal testing module according to claim 1 wherein said logic control unit further comprises:
   a first gate having a first data end, a first output end and a first control end;
   a second gate having a second data end, a second output end and a second control end;
   a flip-flop connecting to either said second control end or said first control end;
   a first pin connecting to said first data end;
   a second pin connecting to said first control end and said flip-flop;
   a third pin connecting to said second data end;
   a fourth pin connecting to said first output end and said second output end.

6. A universal testing module according to claim 5 wherein said flip-flop is connected to said first control end.

7. A universal testing module according to claim 5 wherein said first, second and third pin are selectively connected with a pull up resistor for stabilizing voltage when any of said pins is open.

8. A universal testing module according to claim 5 wherein said first, second and third pin are selectively connected with a pull down resistor for stabilizing voltage when any of said pins is open.

9. A universal testing module to claim 5 wherein said flip-flop is connected to said second control end.

10. A method for detecting electrical condition of communication ports of a computer, including all pins of parallel and serial ports, comprising steps of:
1) providing a testing module connectable through pins of said parallel or serial ports and communicating with said computer;
2) initializing registers which are corresponding to said pins to a predetermined value;
3) transferring a predetermined data between said communication ports and said computer, and recording received data into said registers; and
4) comparing said received data with said predetermined data and judging open, short and normal conditions of said pins.

11. A method for detecting electrical condition of communication ports according to claim 10 wherein said step 3) further comprises steps of:
a) outputting certain data from said computer, and reading status at said testing module via said parallel and serial ports by a walk 0' and a walk 1' logic test separately, and recording a first testing result; and
b) outputting certain data from said testing module, and reading status of said computer via said parallel and the serial ports by a walk 0' and a walk 1' logic test separately, and recording a second testing result.

12. A method for detecting electrical condition of communication ports of a computer, including all pins of parallel and serial ports, by using a testing module communicating via said communication ports with said computer, comprising steps of:
a) initializing corresponding registers of said pins to a certain value;
b) checking if communications between said testing module and said communication ports succeed, if yes, jumps to step d), or proceeds to step c);
c) assuring that pins RD, TD and GND of said serial port fail, then jumps to step g);
d) outputting certain data from said computer, and reading status at said testing module via said parallel and serial ports by a walk 0' and a walk 1' logic test separately, and recording a first testing result;
e) outputting certain data from said testing module, and reading status of said computer via said parallel and serial ports by a walk 0' and a walk 1' logic test separately, and recording a second testing result;
f) outputting said first and the second testing results; and
g) finishing said test.

13. A method for detecting electrical condition of communication ports according to claim 12 wherein sequence of said step d) and said step e) are exchanged.

14. A method for detecting electrical condition of communication ports according to claim 12 wherein said step d) further comprises steps of:
d1) setting an output pin PINx at said computer side with logic value "low", and other pins with value "high";
d2) reading logic values of pins at said testing module side, and recording values in said registers corresponding to said pins as a data record;
d3) checking if only value of said PINx is "low", if yes, jumps to step d5), or proceeds to step d4);
d4) if said PINx is high, said PINx is open; if any other pin PINy excepting from said PINx is also low, said PINy is short with said PINx;
d5) setting an output pin PINx at said computer side with logic value "high", and other pins with value "low";
d6) reading logic values of pins at said testing module side, and recording values in said registers corresponding to said pins as a data record;
d7) checking if only value of said PINx is "high", if yes, jumps to step d9), or proceeds to step d8);
d8) if said PINx is low, said PINx is open; if any other pin PINy excepting from said PINx is also high, said PINy is short with said PINx; Jumps to step d10);
d9) assuring said PINx is normal;
d10) checking if all output pins at said computer side are tested, if yes, jumps to step e), or returns to step d1) for testing next output pin.

15. A method for detecting electrical condition of communication ports according to claim 12 wherein said step e) further comprises steps of:
e1) setting an output pin PINx at said testing module side with logic value "low", and other pins with value "high";
e2) reading logic values of pins at said computer side, and recording values in said registers corresponding to said pins as a data record;
e3) checking if only value of said PINx is "low", if yes, jumps to step e5), or proceeds to step e4);
e4) if said PINx is high, said PINx is open; if any other pin PINy excepting from said PINx is also low, said PINy is short with said PINx;
e5) setting an output pin PINx at said testing module side with logic value "high", and other pins with value "low";
e6) reading logic values of pins at said computer side, and recording values in said registers corresponding to said pins as a data record;
e7) checking if only value of said PINx is "high", if yes, jumps to step e9), or proceeds to step e8);
e8) if said PINx is low, said PINx is open; if any other pin PINy excepting from said PINx is also high, said PINy is short with said PINx; jumps to step e10);
e9) assuring that PINx is normal;
e10) checking if all output pins at said testing module are tested, if yes, jumps to step f), or returns to step e1) for testing next pin.

16. A testing module for testing open condition of pins of a parallel port of a computer by connecting to pins of said parallel port, comprising:
at least a selection line connecting to output pins of said parallel port;
at least a data line connecting to output pins of said parallel port; and
at least an output line connecting to input pins of said parallel port;
whereby a certain signal output from said output line to said selection line makes signal of a certain data line transfer to said parallel port via said output line, and judge if said parallel port is normal by comparing an operating logic value with a received value.

17. A testing module for testing open condition of pins of a parallel port according to claim 16 wherein said testing module is composed of several logic circuit cells.

18. A testing module for testing open condition of pins of a parallel port according to claim 17 wherein said logic circuit cells are selectors.

19. A method for testing open condition of pins of a parallel port of a computer by connecting a testing module to pins of said parallel port, comprising steps of:
1) providing a selector composed of at least a selection line, at least a data line and at least an output line;

2) outputting a certain signal from said output line to said selection line and said data line, and making said selector transferring signal of a certain data line to said output line as a received value, and 3) judging if said parallel port is normal by comparing an operating logic value with said received value.

20. A method for testing open condition of pins of a parallel port according to claim 19 wherein said selector is composed of several logic circuit cells.

21. A method for testing open condition of pins of a parallel port according to claim 19 wherein said judgment in step 3) is made that said parallel port is normal when said operating logic value is same with said received value; and abnormal when said operating logic value is different from said received value.

* * * * *